United States Patent Office 3,814,775
Patented June 4, 1974

---

3,814,775
3-GLYSIDYL-HYDANTOIN ISOCYANATES
Juergen Habermeier, Pfeffingen, and Daniel Porret, Binningen, Switzerland, assignors to Ciba-Geigy AG, Basel, Switzerland
No Drawing. Filed Nov. 9, 1971, Ser. No. 197,121
Claims priority, application Switzerland, Nov. 17, 1970, 16,963/70
Int. Cl. C07d 49/32
U.S. Cl. 260—309.5           5 Claims

ABSTRACT OF THE DISCLOSURE 3-glycidyl-hydantoin isocyanates are disclosed which can be prepared by reacting a di- or tri-isocyanate, such as 3,5,5-trimethyl-3 - isocyanatomethyl - cyclohexaneisocyanate (isophoronediisocyanate) or the triisocyanate obtained from 3 moles of hexamethylene-diisocyanate and having biuret structure, with a 3-glycidyl-hydantoin, e.g. 3-glycidyl - 5,5 - dimethyl - hydantoin. Said 3 - glycidyl-hydantoin isocyanates are suitable, for example, as intermediates for the production of epoxide resins. They can also be cured with polyfunctional cross-linking agents, particularly polyamines and aminoalcohols, to give molded shapes distinguished by good mechanical properties.

---

The present invention relates to new epoxyisocyanates of the general formula:

$$\underset{X}{\overset{O}{\underset{|}{CH_2-C-CH_2-N}}}\overset{O=C-Z}{\underset{\overset{||}{O}}{\underset{C}{N}}-C-N-A[-N=C=O]_n} \quad (I)$$

wherein A represents an $(n+1)$-valent aliphatic, cycloaliphatic, cycloaliphatic-aliphatic, araliphatic, aromatic or heterocyclic-aliphatic radical; Z stands for a bivalent radical of the formula:

$$\overset{R_1}{\underset{R_2}{>C<}} \quad or \quad \overset{R_3}{\underset{R_4}{>C<}} \overset{R_5}{\underset{R_6}{>C<}}$$

whereby $R_1$ and $R_3$ each represent a hydrogen atom, or an aliphatic, cycloaliphatic, araliphatic or aromatic hydrocarbon radical, or whereby $R_1$ and $R_2$ together form a bivalent aliphatic or cycloaliphatic hydrocarbon radical, whereby $R_3$ and $R_5$ each represent a hydrogen atom, or an aliphatic, cycloaliphatic, araliphatic or aromatic hydrocarbon radical, and whereby $R_4$ and $R_6$ each stand for a hydrogen atom or an alkyl radical, wherein X represents a hydrogen atom or the methyl group, and $n$ stands for a whole number to the value of at least 1 and at most 3.

In the above formula (I), A preferably represents a bivalent aliphatic, cycloaliphatic, cycloaliphatic-aliphatic, araliphatic or aromatic hydrocarbon radical, or such an N-heterocyclic-aliphatic radical; $R_1$ and $R_2$ preferably represent hydrogen atoms or lower alkyl radicals having 1 to 4 carbon atoms, or $R_1$ and $R_2$ together represent the tetramethylene or pentamethylene radical; $R_3$, $R_4$, $R_5$ and $R_6$ preferably represent hydrogen atoms or lower alkyl radicals having 1 to 4 carbon atoms; X is preferably a hydrogen atom; and $n$ preferably represents the number 1.

The new epoxyisocyanates can serve as intermediates for the production of epoxide resins. With suitable polyfunctional cross-linking agents, such as, e.g. polyamines, they can also be cross-linked direct, with moulding, to produce plastics.

The epoxisocyanates of formula (I) are produced according to the invention by the reaction, with heating, of 1 mole of a polyisocyanate of the formula:

$$A[-N=C=O]_{n+1} \quad (II)$$

with 1 mole of an N-heterocyclic monoglycidyl compound of the formula:

$$\underset{\underset{O}{\overset{||}{C}}}{\overset{Z-C=O}{HN\underset{}{\overset{|}{N}}-CH_2-\underset{X}{\overset{|}{C}}-CH_2}} \quad (III)$$

whereby the symbols A, Z and X have the same meaning as in formula (I).

The reaction of the polyisocyanates (II) with the N-heterocyclic monoglycidyl compounds (III) is performed, with the exclusion of atmospheric moisture, within the temperature range of 60–200° C., preferably at temperatures of 80–150° C., for, e.g. 2 to 20 hours. It is possible to operate either in the presence of solvents, such as dioxane, or in the absence of solvents. It is advantageous to react the polyisocyanates (II) with the N-heterocyclic monoglycidyl compound (III) in the stoichiometric quantity ratio (molar ratio 1:1); the polyisocyanates can, however, also be used in a stoichiometric excess, so that in the reaction mixture the molar ratio of the N-heterocyclic compound (III) to the polyisocyanate (II) can be, e.g. 1:1 to, e.g. 1:5. Polyisocyanates of formula (II) are, in particular, diisocyanates of the aliphatic, cycloaliphatic, araliphatic, aromatic and heterocyclicaliphatic series. Mentioned as diisocyanates of the aliphatic, cycloaliphatic and araliphatic series are: ethylenediisocyanate, trimethylenediisocyanate, tetramethylenediisocyanate, hexamethylenediisocyanate, decamethylenediisocyanate, 2,2,4- and 2,4,4-trimethylhexamethylenediisocyanate, or commercial mixtures thereof; diisocyanates of the formula OCN—Y—NCO, wherein Y represents the hydrocarbon radical of an optionally hydrogenated dimerized fatty alcohol; cyclopentylenediisocyanate-1,3, cyclohexylenediisocyanate-(1,4), -(1,3) or -(1,2), hexahydrotoluylenediisocyanate-(2,4) or -(2,6), 3,5,5 - trimethyl - 3 - isocyanatomethylcyclohexaneisocyanate-(1) (="isophoronediisocyanate"); dicyclohexylmethanediisocyanate-(4,4').

The following are listed as diisocyanates of the aromatic series:

o-, m- and p-xylylene-α,α'-diisocyanate,
toluylenediisocyanate-(2,4),
toluylenediisocyanate-(2,6), or commercial mixtures thereof;
diphenylmethane-4,4'-diisocyanate,
naphthalene-1,5-diisocyanate,
3,3'-dimethylbiphenyl-4,4'-diisocyanate,
3,3'-dimethoxy-4,4'-diphenyldiisocyanate,
3,3'-dichlorodiphenyl-4,4'-diisocyanate,
4,4'-diphenyldiisocyanate,
diphenyldimethylmethane-4,4'-diisocyanate,
p,p'-dibenzyldiisocyanate,
phenylene-1,4-diisocyanate,
phenylene-1,3-diisocyanate,
2,3,5,6-tetramethyl-p-phenylenediisocyanate;

the uretdionediisocyanates obtainable by dimerization of aromatic diisocyanates, such as, e.g. 2,4-toluylenediisocyanate, e.g. 1,3-bis-(4'-methyl-3'-isocyanatophenyl)-uretdione of the formula:

N,N'-di-(4-methyl-3-isocyanatophenyl)-urea.

Furthermore, the following diisocyanates can be used:

The addition products of 2 moles of toluylene-2,4-diisocyanate with one mole of a glycol, such as are dealt with by E. Müller in Houben-Weyl, 4th ed., vol. XIV/2 on pp. 66 and 71–72; also the corresponding addition products of 2 moles of "isophoronediisocyanate" with 1 mole of a glycol.

Mentioned as diisocyanates of the heterocyclic-aliphatic series are the following:

1,3-di-(γ-isocyanatopropyl)-hydantoin,
1,3-di-(γ-isocyanatopropyl)-5-methylhydantoin,
1,3-di-(γ-isocyanatopropyl)-5,5-dimethylhydantoin,
1,3-di-(γ-isocyanatopropyl)-5-methyl-5-ethylhydantoin,
1,3-di-(γ-isocyanatopropyl)-5-ethylhydantoin,
1,3-di-(γ-isocyanatopropyl)-5-propylhydantoin,
1,3-di-(γ-isocyanatopropyl)-5-isopropylhydantoin,
1,3-di-(γ-isocyanatopropyl)-1,3-diazaspiro-(4,4)-nonane-2,4-dione, and
1,3-di-(γ-isocyanantopropyl)-1,3-diazaspiro-(4,5)-decane-2,4-dione,
1,3-di-(γ-isocyanatopropyl)-5,5-dimethyl-5,6-dihydrouracil, and
1,3-di-(γ-isocyanatopropyl)-6-methyl-5,6-dihydrouracil;
1,1′-methylene-bis-(3-γ-isocyanatopropylhydantoin);
1,1′-methylene-bis-(3-γ-isocyanatopropyl-5,5-dimethylhydantoin);
1,1-methylene-bis-(3-γ-isocyanatopropyl-5-methyl-5-ethylhydantoin);
bis-(1′-γ-isocyanatopropylhydantoinyl-3′)-methane;
1,2-bis-(1′-γ-isocyanatopropyl-5′,5′-dimethylhydantoinyl-3′)-ethane;
1,4-bis-(1′-γ-isocyanatopropyl-5′-methyl-5′-ethylhydantoinyl-3′)-butane;
1,6-bis-(1′-γ-isocyanatopropyl-5′-isopropylhydantoinyl-3′)-hexane;
1,12-bis-(1′-γ-isocyanatopropyl-5′,5′-pentamethylenehydantoinyl-3′)-dodecane; and
β,β′-bis-(1′-γ-isocyanatopropyl-5′,5′-dimethylhydantoinyl-3′)-diethyl ether.

It is also possible to employ tri- and tetraisocyanates of the aliphatic, cycloaliphatic, araliphatic, aromatic or heterocyclic series. Mentioned as such are, e.g.:

benzene-1,3,5-triisocyanate,
toluylene-2,4,6-triisocyanate,
ethylbenzene-2,4,6-triisocyanate,
monochlorobenzene-2,4,6-triisocyanate,
triphenylmethane-4,4′,4″-triisocyanate,
diphenyl-2,4,4′-triisocyanate,
4,4′-methylene-bis-(o-toluylenediisocyanate),
thiophosphoric acid-tris-(4-isocyanatophenyl ester).

Also applicable are tri- and tetraisocyanates having biuret structure, such as can be obtained, e.g. by the reaction of 3 to 4 moles of a diisocyanate with 1 mole of a diamine, e.g. with a ω,ω′-diaminopolyether (cp. the German Auslegeschrift 1,215,365).

It is likewise possible to use triisocyanates or tetraisocyanates which can be produced by the addition to trihydroxy or tetrahydroxy compounds, e.g. 1,1,1-trimethylolpropane or pentaerythrite, of 1 mole of each hydroxyl group of a diisocyanate of which the two isocyanate groups possess a different reactivity (e.g. 2,4-toluylenediisocyanate or "isophoronediisocyanate").

The N-heterocyclic monoglycidyl compounds of formula (III) can be produced in a known manner in that 1 mole of an N-heterocyclic compound of the formula:

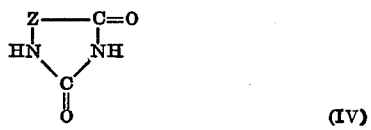

(IV)

wherein Z has the same meaning as in formula (I) is reacted, in the first stage, with 1 mole of an epihalogenhydrin or of a β-methylepihalogenhydrin, preferably with 1 mole of epichlorohydrin or β-methylepichlorohydrin, in the presence of a catalyst such as, preferably, a tertiary amine, a quaternary ammonium base, or a quaternary ammonium salt such as benzyltrimethylammonium chloride, under conditions where only the more strongly acid endocyclic NH— group is substituted in position 3 of the ring, to give the halogenhydrin; and, in a second stage, the obtained product containing halogenhydrin groups is then treated with agents splitting off hydrogen halides, preferably with strong alkalis such as sodium chloride. The N-heterocyclic compounds of formula (IV) are, in particular, hydantoin, hydantoin derivatives, dihydrouracil and dihydrouracil derivatives. The hydantoin and preferred derivatives thereof correspond to the general formula

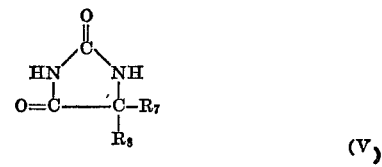

(V)

wherein $R_7$ and $R_8$ each represent a hydrogen atom or a lower alkyl radical having 1 to 4 carbon atoms, or wherein $R_7$ and $R_8$ together form a tetramethylene or pentamethylene radical. Mentioned in this respect are: hydantoin, 5-methylhydantoin, 5-methyl-5-ethylhydantoin, 5-n-propylhydantoin, 5-isopropylhydantoin, 1,3-diazospiro(4.5)-decane-2,4-dione, 1,3-diazaspiro(4.4)-nonane-2,4-dione and, preferably, 5,5-dimethylhydantoin.

The dihydrouracil (=2,4-dioxohexahydropyrimidine) and preferred derivatives thereof correspond to the general formula:

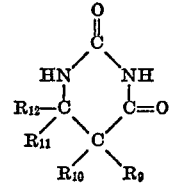

wherein $R_9$ and $R_{10}$ both represent a hydrogen atom or identical or different alkyl radicals, preferably alkyl radicals having 1 to 4 carbon atoms; and $R_{11}$ and $R_{12}$ each represent, independently of each other, a hydrogen atom or an alkyl radical. Preferably, in the above formula, the two radicals $R_7$ and $R_8$ represent methyl groups, $R_9$ a hydrogen atom or a lower alkyl radical having 1 to 4 carbon atoms, and $R_{10}$ a hydrogen atom. Mention is made of the following: 5,6-dihydrouracil, 5,5-dimethyl-5,6-dihydrouracil (2,4-dioxo-5,6 - dimethylhexahydropyrimidine) and 5,5-dimethyl-6-isopropyl - 5,6 - dihydrouracil (2,4-dioxo-5,5-dimethyl - 6 - isopropylhexahydropyrimidine). In the hydantoins and dihydrouracils in question, the NH— group in 3-position, situated between the two carbonyl groups, is of acid character, and can be quantitatively determined, e.g. by potentiometric titration with alkali. Particularly good yields of monoglycidyl compound (III) are obtained by using, in the reaction mixture, a stoichiometric excess of epichlorohydrin or of methylepichlorohydrin above the amount required for the addition to the NH— group in 3-position of the heterocyclic ring. There already occurs during the catalytic addition of the epichlorohydrin in the first reaction stage, before the addition of alkali, a partial epoxidation of the dichlorohydrin of the hydantoin. The epichlorohydrin, which acts as a hydrogen chloride acceptor, is then partially converted into glycerindichlorohydrin. In the case of the reaction of the above described hydantoins or dihydrouracils with a stoichiometrical excess of epichlorohydrin above the amount required for monoglycidylation, in the presence of a catalyst, the acid NH— group in 3 position of the ring reacts more rapidly than the NH— group in position 1 of the ring. It is therefore possible to substantially quantitatively react the more strongly acid NH— group with the epichlorohydrin before the more weakly acid NH— group has appreciably reacted. If, therefore, the reaction leading to the chlorohydrin is interrupted at the correct moment (evidence of the consumption of approximately 1 mole of epichlorohydrin per mole of hydantoin or dihydrouracil with the aid of a sample of the reaction mixture), and the reaction then allowed to occur with the equivalent amount of alkali, then the monoglycidyl derivative of formula (III) is obtained as the main product.

The epoxyisocyanates of formula (I) according to the invention are capable of reaction with all compounds containing functional groups capable of reaction with epoxy groups and/or isocyanate groups, such as, e.g. polyesters, polyethers, polythioethers, polyacetals, polyols, polyepoxides containing hydroxyl groups, polyacrylates, phenols, mercaptans, amines, ureas, caprolactam, carboxylic acids, carboxylic acid anhydrides, carboxylic acid amides, N-acylamides, N-alkylamides, sulphamides. They can be used for the synthesis of isocyanurates and for the production of polyepoxides.

With suitable polyfunctional cross-linking agents, particularly polyamines and aminoalcohols, the epoxyisocyanates according to the invention can also be cured direct to provide moulded shapes having good mechanical properties. Depending on the choice of curing agent, curing can be carried out either at room temperature (18–25° C.) or at elevated temperature (e.g. 50–180° C.). Curing can, optionally, be carried out in two steps; suitable cross-linking agents are selected for this purpose, e.g. aromatic polyamines, such as bis (p-aminophenyl)-sulphone, which react at moderately elevated temperatures with the isocyanate group only, and with the epoxiide group only at appreciably higher temperatures. In the first stage is thus obtained a curable precondensate which is still meltable and soluble (stage known as the B-stage). A precondensate of this kind can be used, e.g. for the production of prepregs, moulding materials or sinter powders. The present invention relates therefore also to curable mixtures which are suitable for the production of moulded shapes, including flat-shaped articles, such as coatings or bonds, and which contain (a) epoxyisocyanates according to the invention, and (b) cross-linking agents, such as polyamines or aminoalcohols. To the epoxyisocyanates according to the invention, or to mixtures thereof with cross-linking agents, can moreover be added before curing, in some phase, conventional modification agents such as extenders, fillers and strengthening agents, pigments, dyes, organic solvents, softeners, levelling agents, thixotropic agents, expanding agents, fire-retarding substances, mould release agents. Examples of extenders, strengthening agents, fillers and pigments which can be used in the curable mixtures according to the invention are as follows: glass fibres, boron fibres, carbon fibres, asbestos fibres, natural and synthetic textile fibres such as polyester fibers, polyamide fibres, polyacrcylonitrile fibres; polyethylene powders, polypropylene powders, quartz powder, mica, kaolin, aluminium oxide trihydrate, silicic acid aerogel ("Aerosil"), titanium dioxide, soot, oxide colors such as iron oxide, or metal powders such as aluminium powder or iron powder. The curable mixtures according to the invention can be produced in the usual manner with the aid of known mixing aggregates (stirrers, kneaders, rollers). The curable mixtures according to the invention can be employed in the form of preparation most suitable for the specific purpose for which they are required: in the loaded or unloaded condition, optionally in the form of solutions or emulsions, as coating agents, lacquers, moulding materials, sinter powders, dipping resins, casting resins, foam plastics, impregnating resins, laminating resins, bonding agents, adhesives and fillers. Where not otherwise stated in the following examples, the term "parts" denotes parts by weight, and percentages signify percent by weight. Parts by volume and parts by weight are in proportion to each other as millilitre and gram.

(A) PRODUCTION OF THE STARTING MATERIALS (1) 3-glycidyl-5,5-dimethylhydantoin

A mixture of 128 g. of 5,5-dimethylhydantoin (1 mole), 2775 g. of epichlorohydrin (30 moles) and 0.66 g. of benzyltrimethylammonium chloride was heated to 118° C. for 95 minutes. A sample taken from the reaction mixture then showed, after the excess epichlorohydrin and the formed 1,3-dichloropropan-(2)-ol had been distilled off, an epoxide content of 2.78 epoxide equivalents/kg. The reaction mixture was cooled to 60° C., and an addition was then made in small portions, within 20 minutes and with vigorous stirring, of 42.3 g. of finely powdered sodium hydroxide (1.05 moles). After the addition was completed, the mixture was stirred for a further 30 minutes at 60° C. The water formed during the reaction was subsequently removed by azeotropic distillation, together with a portion of the epichlorohydrin, at 60° C. and under 35 torr. After cooling, the formed sodium chloride was separated off by filtration, and the clear filtrate was concentrated firstly at 30 torr. and then high vacuum.

In this manner were obtained 198.5 g. (theoretical amount for (N)3-glycidyl-5,5-dimethylhydantoin: 184 g.) of a slightly yellow colored crystal mass having an epoxide content of 4.96 epoxide equivalents/kg. (theoretical amount for (N)3-glycidyl - 5,5 - dimethylhydantoin: 5.43 epoxide equivalents/kg.).

The product was recrystallized once from methyl ethyl ketone and once from acetone, and (N)3-glycidyl-5,5-dimethylhydantoin was obtained as pure white crystal powder. M.P.: 97–98° C.

Epoxiide content: 0.2%.

*Elementary analysis.*—Calculated (percent): C, 52.16; H, 6.57; N, 15.21. Found (percent): C, 52.11; H, 6.57; N, 15.00.

The product consists essentially of 3-glycidyl-5,5-dimethylhydantoin of the structure:

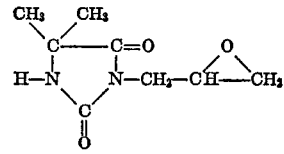

(2) 3-(β-methylglycidyl)-5,5-dimethyl-6-isopropyl-5,6-dihydrouracil

A mixture of 328.8 g. of 5,5-dimethyl-6-isopropyl-5,6-dihydrouracil (=2,4-dioxo-5,5-dimethyl - 6 - isopropylhexahydropyrimidine) (1.782 moles), 1900 g. of β-methylepichlorohydrin (17.85 moles) and 8.82 g. of tetraethylammonium chloride is stirred for 3 hours at reflux temperature (115 to 122° C.); and a clear colorless solution is thus obtained. This is then cooled to 60° C., and to it are slowly added dropwise in the course of 2 hours at 60° C., with vigorous stirring, 192.5 g. of 50% sodium hydroxide solution (2.4 moles); the water present in the reaction mixture is at the same time continually separated by means of azeotropic circulatory distillation under 60 to 90 torr vacuum. After completion of the addition of sodium hydroxide solution, entrainment of water is continued for a further 30 min. The sodium chloride formed during the reaction is then separated by filtration, and afterwards rinsed with 50 ml. of β-methylepichlorohydrin. The combined solutions are extracted by shaking with 180 ml. of water to effect the removal of residues of sodium chloride and of the catalyst.

After separation of the aqueous layer, the organic phase is concentrated at 60° C./18 torr, and then treated at 60° C./0.1 torr until the weight remains constant.

A crystalline, colorless product is obtained with 3.92 epoxide equivalents/kg. (100% of theoretical amount); the yield is 432.0 g. (95% of the theoretical value).

For purification, the thus obtained 3-(β-methylglycidyl)-5,5-dimethyl-6-isopropyl-5,6-dihydrouracil can be recrystallized from water/methanol (5:1). The purified product melts at 106 to 108° C.

The elementary analysis is as follows: Calculated (percent): C, 61.39; H, 8.72; N, 11.02; Cl, 0.0. Found (percent C, 61.44; H, 8.54; N, 11.21; Cl, <0.3.

The vapor-pressure osmometrical molecular weight determination gives a molecular weight of 255 (calculated: 254.32).

The nuclear magnetic resonance spectrum (60 mc. HNMR, taken in deuterochloroform) proves, together with the above data, by the presence of the following signals, the structure given below:

1 proton at δ=6.72:

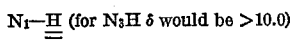

2 protons at δ=3.45–4.20:

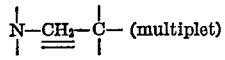

1 proton at δ=2.90–3.05:

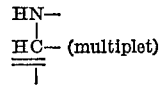

2 protons at δ=2.47–2.80:

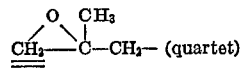

1 proton at δ=1.50–2.30:

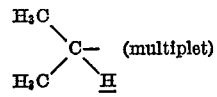

9 protons at δ=1.23–1.50:

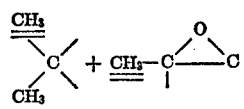

6 protons at δ=0.66; δ=0.78; δ=0.91; δ=1.03:

(B) MODEL TESTS (a) The following model experiment shows that organic isocyanates react with the N₁–H group of hydantoins to give stable adducts. With 5,5-dimethylhydantoin and phenylisocyanate as model substances, the reaction proceeds in the following manner:

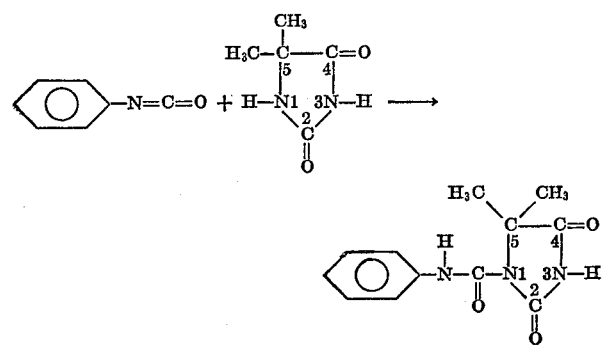

This reaction proceeds smoothly and with good yields. It is shown that the thus obtained derivatives are at least as thermostable as the urethanes obtainable from the corresponding isocyanates; this was tested by the following experiments:

A mixture of 128.1 g. of 5,5-dimethylhydantoin (1 mole) and 119.2 g. of phenylisocyanate (1 mole) is placed, at room temperature, in a 500 ml. glass flask fitted with stirrer, thermometer and reflux condenser. The formed mass is heated within 15 minutes, with stirring, to 150° C. A clear thinly fluid melt is obtained after about 80 minutes under the stated conditions. This melt is stirred for a further 2 hours at 160° C. in order to complete the reaction. The mass crystallizes immediately on cooling. In this manner are obtained 233 g. of light-yellow crystals (yield: 94.3% of the theoretical amount).

The product is purified by being recrystallized from absolute ethanol. A practically colorless fine crystallizate, M.P. 166–168° C., is obtained in 69.8% net yield (172 g.).

The elementary analysis gives the following result: Calculated (percent): C, 58.29; H, 5.30; N, 17.00. Found (percent): C, 58.11; H, 5.33; N, 16.85.

The infra-red spectrum shows, by the presence of bands for an aromatic ring and bands for the hydantoin structure, that the desired product is obtained. This finding is further verified by the presence of three amide—N—H frequencies (3280 cm.⁻¹, 3202 cm.⁻¹, 3095 cm.⁻¹), and by three carbonyl absorption bands (1782 cm.⁻¹, 1740 cm.⁻¹, 1710 cm.⁻¹).

Also the proton-magnetic resonance spectrum (60 mc. NMR, taken in deuterchloroform at 35° C., with tetramethylsilane as the internal standard) indicates, by the presence of signals for the aromatic ring at δ=6.95–7.55 (multiplet), of signals for CH₃ and N—H group of the hydantoin, besides the signal for the urea-amide (N—H)— group, that the obtained final product has the structure shown below:

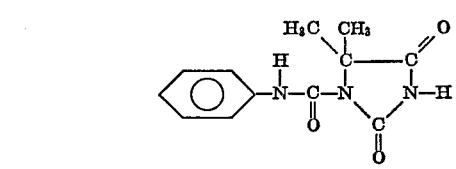

A specimen of 70 g. of the thus synthesized compound is examined in a glass flask provided with descending condenser and thermometer, with respect to the thermal reverse splitting in phenylisocyanate and dimethylhydantoin. The substance is totally melted at a bath temperature of 175° C., and has a temperature of 168° C.; there are no signs of a decomposition to be observed. The temperature of the specimen is then rapidly raised to 250° C.; at this point too there is no sign of decomposition. At a temperature of 215° C., there are very faint signs of bubble information in the melt. There commences at 232° C., a very slow decomposition, and with a specimen temperature of 240° C., phenylisocyanate begins to distill off. A relatively rapid distillation commences at 260° C.

On the basis of this test, the decomposition point of the new substance can be given as 220–230° C.; on the other hand, urethanes from primary aliphatic alcohols and aromatic isocyanates are already decomposing from about 200° C.

(b) The following experiment demonstrates that 3-glycidyl-5,5-dimethylhydantoin and phenylisocyanate as model substances react with each other smoothly and with good yield:

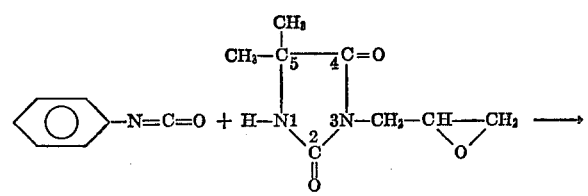

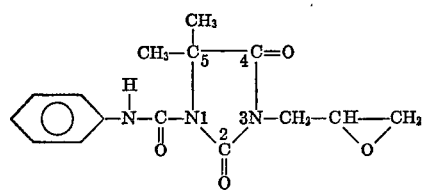

The isocyanate group hence reacts with the $N_1$—H group of the hydantoin, analogously to the manner described in the case of the model test (a), to give a stable adduct, whilst the glycidyl group remains intact.

A mixture of 36.8 g. (0.2 moles) of 3-glycidyl-5,5-dimethylhydantoin (M.P. 95–97° C., epoxide content 5.44 equivalents/kg., 100% of the theoretical amount), 100 ml. of dioxane and 23.8 g. of phenylisocyanate (0.2 moles) is prepared at room temperature, whereupon a clear colorless solution is obtained. The solution is stirred at 125° C. bath temperature, resulting in an internal temperature of 104–107° C. This temperature is maintained for 150 minutes; the solution is then cooled to room temperature, filtered, and completely concentrated in a rotary evaporator at 70° C. under a water-jet vacuum; drying is subsequently carried out at 70° C., under 0.1 torr until constant weight is obtained, and the reaction product crystallizes out.

Thus obtained are 60.6 g. (yield: 100% of the theoretical amount) of a practically colorless crystallizate containing 2.95 epoxide equivalents/kg. (89.4% of the theoretical amount).

The product is purified by recrystallization from acetone, whereupon is obtained a colorless crystallizate which melts at 92–93.5° C. The epoxide content of the purified product amounts to 3.18 equivalents/kg.; this corresponds to 96.4% of the theoretical amount.

The elementary analysis shows: Calculated (percent): N, 13.86. Found (percent): N, 13.85.

The infra-red spectrum (Nujol trituration) shows, in contrast to the final product from model test (a) for the hydantoin structure, only one amide—(N—H)— frequency at 3320 cm.$^{-1}$, but the same bands for carbonyl group and aromatic ring as the final product from model test (a); furthermore, the absorptions of the glycidyl group are now also visible. Also the proton-magnetic resonance spectrum is in agreement with the structure shown below.

The ultraviolet spectrum (taken in chloroform, concentration: $10^{-4}$ mol/litre) indicates a $\lambda$ max. at 249 $\mu$m. with the extinction $E_1^1$ max of 15,000.

The mass spectrum proves moreover the structure given below. The molecule-ion appears quite pronounced with 303 units of mass; this is in agreement with the theoretical molecular weight of 303.3. The fragment-ion with 184 units of mass might well come from the isocyanate cleavage from the molecule-ion.

The product thus consists of the monoepoxide of the structure:

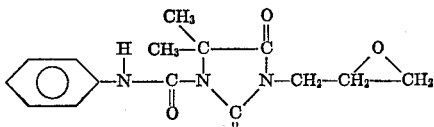

(C) PRODUCTION EXAMPLES

Example 1

In a dry glass flask fitted with stirrer, thermometer and reflux condenser, 92.1 g. of 3-glycidyl-5,5-dimethylhydantoin (0.5 moles) and 113.5 g. (0.52 moles) of 3,5,5-trimethyl - 3 - isocyanatomethylcyclohexaneisocyanate-1 ("isophoronediisocyanate") are stirred at 60° C. The reaction becomes exothermic, the temperature rising, after removal of the heating bath, to 108° C. After the exothermic reaction has ceased, the clear melt is stirred for a further 2 hours at 105–110° C. In order to check the addition, a specimen is taken from the mixture and analyzed. The colorless solid adduct softens at about 30° C. Its epoxide content is 2.47 equivalents/kg. (theory: 2.50 equiv./kg.) and its isocyanate-group content is 9.79%. The infra-red spectrum (taken on sodium chloride disks according to the capillary technique) shows both

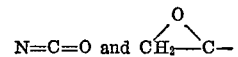

absorptions. The proton magnetic resonance spectrum (60 mc. HNMR, in CDCl$_3$ at 35° C., against tetramethylsilane) shows, amongst other, the following signals:

$\delta = 1.72$:

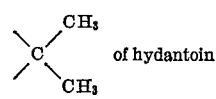 of hydantoin $\delta = 2.55$–$2.90$:

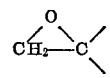

$\delta = 0.98$–$1.40$: aliphatically bound CH$_3$, cyacloaliphatically bound CH$_2$.

Accordingly, the product consists essentially of the compound of the following structure:

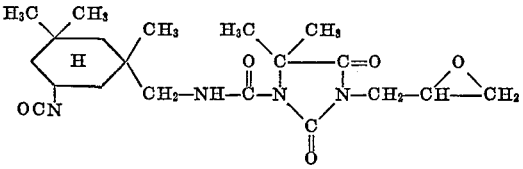

Example 2

In glass apparatus as used in Example 1, 187 g. of 3-glycidyl-5,5-dimethylhydantoin (1.0 mole) are stirred at 100° C. with 300 ml. of dioxane. To this solution are added dropwise within 30 minutes, with stirring, a solution of 168.2 g. of hexamethylenediisocyanate (1.0 mole) in 100 ml. of dioxane. The colorless clear solution is stirred for 120 minutes at 100–105° C. After the dioxane has been distilled off, a viscous colorless resin is obtained having an epoxide content of 2.8 epoxide equivalents/kg.

The product consists essentially of the compound of the formula:

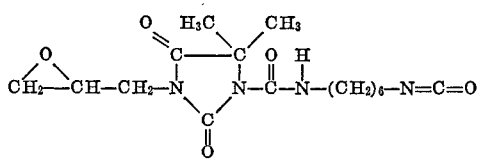

Example 3

An amount of 125.6 g. of a pure crystalline 3-($\beta$-methylglycidyl)-5,5-dimethyl - 6 - isopropyl - 5,6 - dihydrouracil ($F_p = 105$–$107°$ C.) (0.494 moles) is melted and stirred at 110° C. To the melt are then added within 10 minutes, with vigorous stirring, 86.0 g. (0.494 moles) of toluylene-2,4-diisocyanate. The reaction is slightly exothermic. An easily stirrable, pale yellow liquid is obtained which continually becomes more viscous. The reaction is allowed to proceed for one hour at 110° C., and for a further 45 minutes at 140° C.; the formed epoxyisocyanate can then be poured on to a metal sheet, on which it solidifies on cooling. The crystal mass is ground and stored in a dry vessel. The new epoxyisocyanate melts at 128° C. The epoxide content of the adduct is 2.4 equivalents/kg. (corresponding to 100% of the theoretical amount); the product consists essentially of the compound of the following structure:

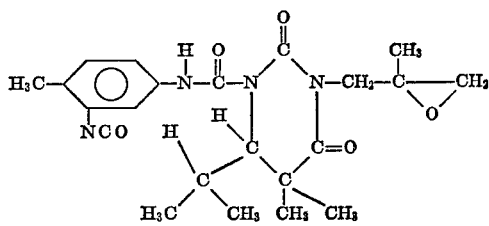

Example 4

Conformably to Example 1, 36.8 g. (0.2 moles) of 3-glycidyl-5,5-dimethylhydantoin are reacted with 66.2 g. (0.2 moles) of 89% 1,3-di(isocyanatopropyl)-5,5-dimethylhydantoin. In this case too there occurs an exothermic reaction, the temperature of the mixture rising to 94° C. The reaction is subsequently allowed to proceed for 90 minutes at 95° C. The new epoxyisocyanate, obtained in quantitative yield, is transferred to a glass flask and this sealed in an air-tight manner. The content of NCO-groups is 5.1%; the epoxide content amounts to 1.96 equivalents/kg. (95% of the theoretical amount). The infra-red spectrum confirms that a mixture has been obtained having essentially the following structures:

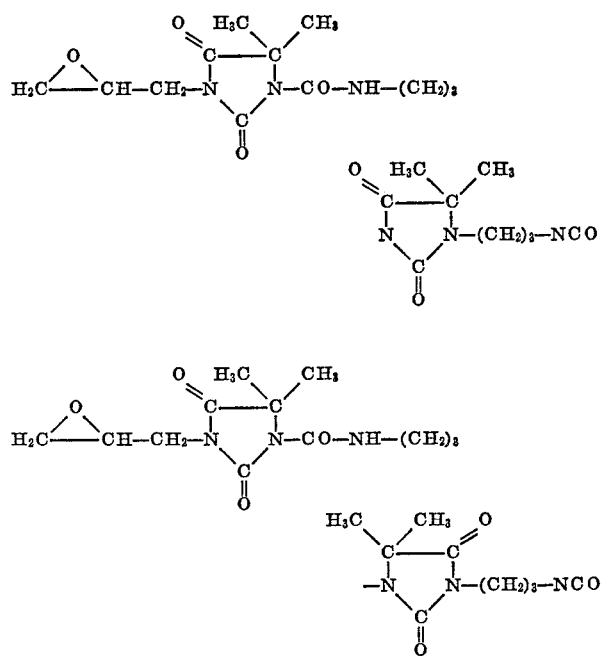

Example 5

Analogously to Example 1, 73.7 g. (0.4 moles) of 3-glycidyl-5,5-dimethylhydantoin are reacted with 0.4 moles of a triisocyanate produced from 3 moles of hexamethylenediisocyanate and having biuret structure (75% in xylene, glycoacetate), obtainable under the trade name of "Desmodur N." The temperature of the mixture is raised to 97° C. in consequence of the exothermic reaction, stirring being subsequently continued for a further 90 minutes at 100° C. After cooling is obtained, in quantitative yield, a liquid clear pale yellow resin of which the IR spectrum agrees essentially with structures of the following type:

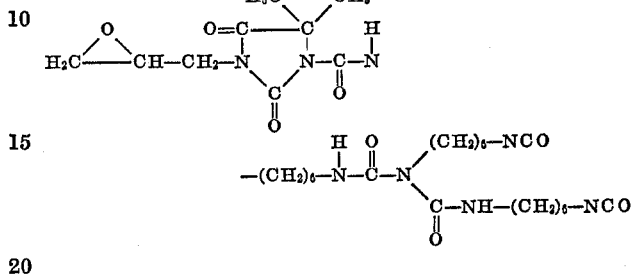

(D) APPLICATION EXAMPLES

Example I 88.4 parts of the epoxyisocyanate produced according to Example 1 consisting of 1 mole of 3-glycidyl-5,5-dimethylhydantoin and 1 mole of isophoronediisocyanate and having the epoxide content of 2.47 equivalents/kg. and the isocyanate content of 9.79% NCO are mixed at 70° C. with 11.7 parts of 1,6-hexamethylenediamine to form a homogeneous mixture, this being then poured into an aluminium mould. The mixture reacts immediately exothermically; it gels and hardens to form a pale, unmeltable and insoluble moulded shape.

Example II 88.4 parts of the epoxyisocyanate used in Example I are mixed at 80° C. with 7.5 parts of 3-aminopropan-2-ol, and the mixture is then poured into an aluminium mould. There occurs on mixing an intense exothermic reaction; the mixture gels spontaneously, and hardens to form a clear, practically colorless, insoluble and unmeltable moulded shape.

Example III

A mixture of 40 parts of the epoxyisocyanate employed in Example I and 11.5 parts of 4,4'-diaminodiphenylsulphone is stirred at 110° C. to obtain a homogeneous mass. An exothermic reaction occurs and an adduct is thus formed which is solid at 120° C., brittle and still meltable. If this adduct is cured in an aluminium mould for 14 hours at 180–200° C., then a clear, slightly yellow moulded shape is obtained possessing good mechanical properties.

The adduct produced in the "preliminary reaction" and still containing epoxide and amino groups, but practically no longer isocyanate groups, can be ground. The obtained powder resin is storage-stable, since the amino group of the diaminodiphenylsulphone reacts only at relatively high temperatures with epoxide groups. The powder resin can be used for the production of moulding materials or sinter powders.

Example IV 40 parts of the epoxyisocyanate used in Example I are mixed with 14.3 parts of methylenebis-(o-chloroaniline) at 110° C.; and the mixture is then allowed to react for 2 hours at this temperature. In this manner is obtained a solid adduct which can still be melted. In a second stage, the adduct is cured in an aluminum mould for 10 hours at 200° C.

A somewhat darkly colored moulded shape is thus obtained having good mechanical properties.

What is claimed is:
1. A 3-glycidyl-hydantoin isocyanate of the formula

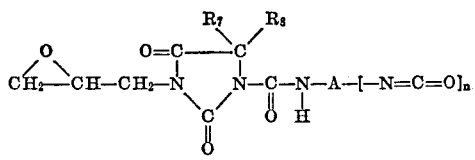

(I)

wherein $n$ represents the number 1 or 2; A, if $n$ is the number 1, represents alkylene of 2 to 10 carbon atoms, phenylene, xylylene, tolylene, cyclohexylene, cyclopentylene, a group of the formula

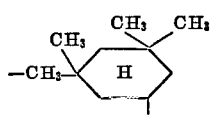

which is linked to the —NH— group through the —CH$_2$— radical, or a group of the formula

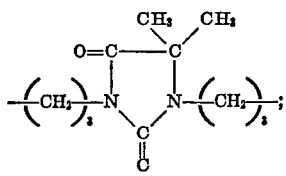

and if $n$ is the number 2, A represents a group of the formula

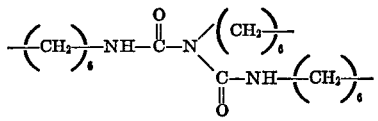

which is linked to the —NH— group through either of the

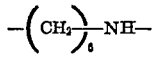

radicals, R$_7$ and R$_8$ each represent hydrogen or alkyl of 1 to 4 carbon atoms or R$_7$ and R$_8$ together are tetramethylene or pentamethylene.

2. The compound according to claim 1 of the formula:

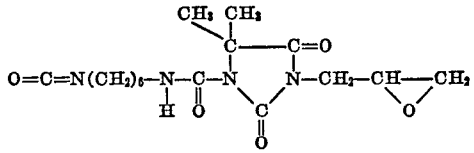

3. The compound according to claim 1 of the formula:

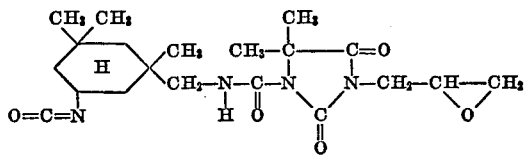

4. Compounds according to claim 1 of the formula:

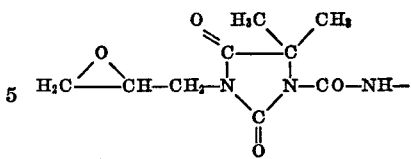

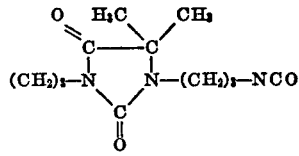

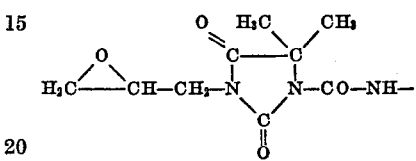

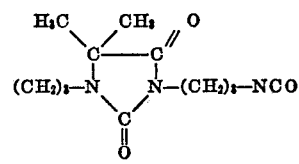

5. The compounds according to claim 1 of the formula:

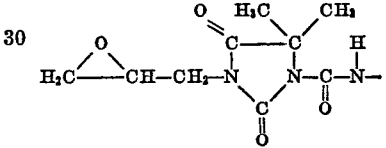

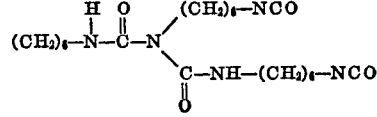

References Cited
UNITED STATES PATENTS

| | | | |
|---|---|---|---|
| 2,960,534 | 11/1960 | Scherer et al. | 260—553 R |
| 3,347,658 | 10/1967 | Luckenbauch | 260—553 R |

FOREIGN PATENTS

| | | | |
|---|---|---|---|
| 1,523,597 | 3/1968 | France | 260—309.2 |

OTHER REFERENCES

Degering: An Outline of Organic Nitrogen Compounds, p. 532, Ypsilanti, Mich., Univ. Litho Printer, 1950.
Wagner et al.: Synthetic Organic Chemistry, p. 645, New York, Wiley, 1953.

NATALIE TROUSOF, Primary Examiner

U.S. Cl. X.R.

260—2 EP, 2 EC, 13, 37 R, 37 EP, 40 TN. 75 EP, 77.5 HT, 256.4 C, 824 EP, 830 R, 830 P, 835